Jan. 23, 1962
E. POUGET
3,017,794
APPARATUS FOR SETTING SLEEPER SCREWS OR
TRACK BOLTS TO A PREDETERMINED
DEGREE OF TIGHTNESS
Filed June 6, 1960
2 Sheets-Sheet 1
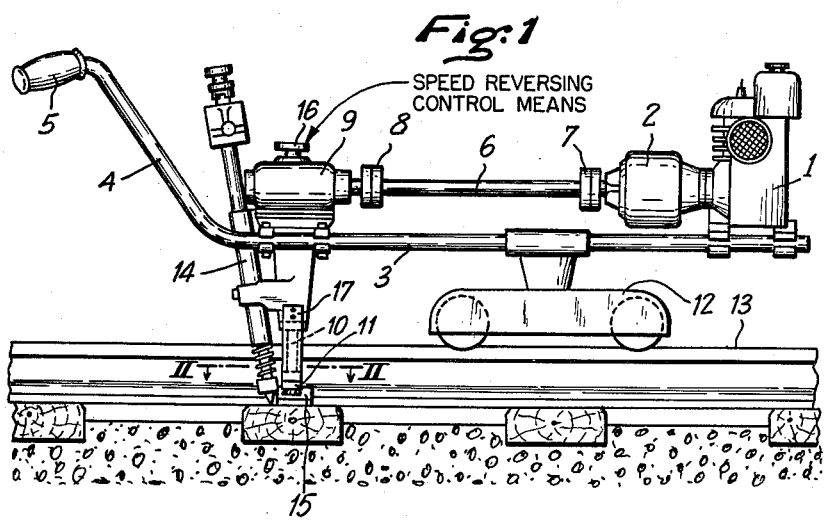
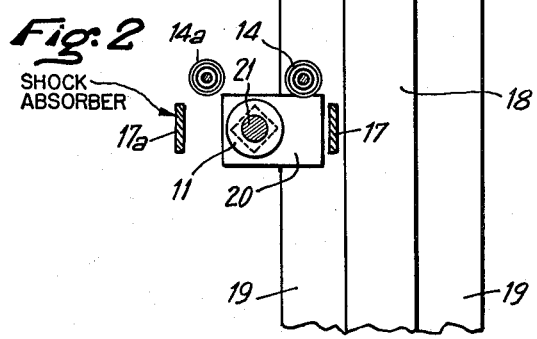
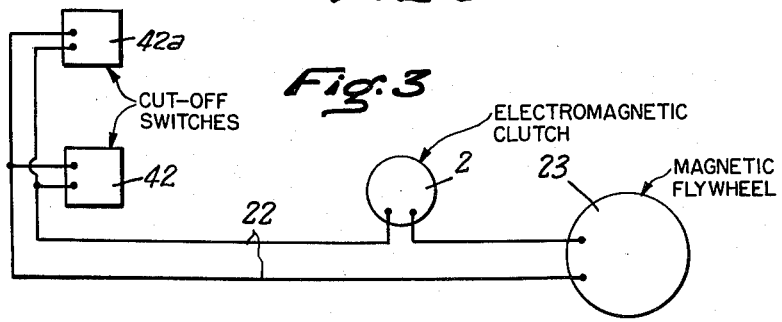
INVENTOR
EDMOND POUGET
BY Irvin S. Thompson
ATTORNEY Jan. 23, 1962
E. POUGET
3,017,794
APPARATUS FOR SETTING SLEEPER SCREWS OR
TRACK BOLTS TO A PREDETERMINED
DEGREE OF TIGHTNESS
Filed June 6, 1960
2 Sheets-Sheet 2
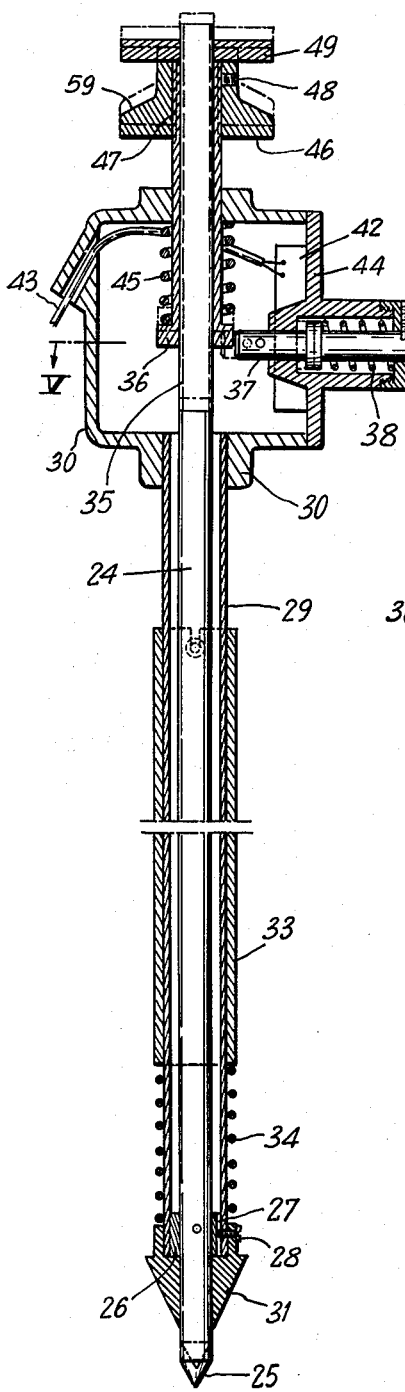
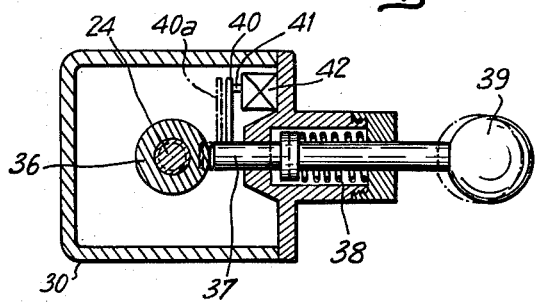
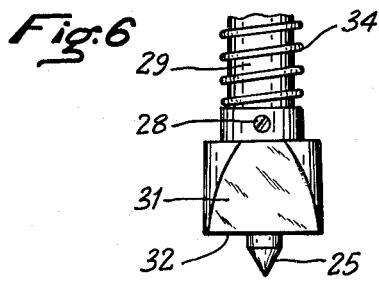
INVENTOR
EDMOND POUGET
BY *Irvin S. Thompson*
ATTORNEY

United States Patent Office 3,017,794
Patented Jan. 23, 1962

3,017,794
APPARATUS FOR SETTING SLEEPER SCREWS OR TRACK BOLTS TO A PREDETERMINED DEGREE OF TIGHTNESS
Edmond Pouget, 190 Bis, Ave. de Stalingrad, Saint Ouen, France
Filed June 6, 1960, Ser. No. 33,987
Claims priority, application France June 13, 1959
5 Claims. (Cl. 81—54)

The rapid succession of improvements in the technique of railways allows the trains to run at increasingly high speeds and it is necessary, consequently, to design tracks which allow running at such high speeds; furthermore, the tracks should be capable of carrying increasingly large loads by reason of the steady increase in the weight of trains.

In the last few years, rails of a considerable length have been produced for this purpose through the welding of different elements in alignment with one another.

Such rails are secured to the sleepers by means of arrangements different from prior conventional means and constituted by special elastic attachment means adapted to engage the rail shoe and to be secured to the latter through the agency of sleeper screws.

With such arrangements, it is necessary to resort to a very accurate tightening of the sleeper screws and it has been attempted for this purpose to perfect apparatus which allow an extremely accurate positioning of the sleeper screws.

The apparatus known hitherto for producing an accurate tightening of the sleeper screws includes a wrench controlled by a clutch. The system including said wrench and its clutch may be disconnected with reference to the power unit controlling it, whenever a large resistant torque arises during the tightening operation.

It has also been proposed to perfect apparatus which allows cutting out the means controlling the wrench actuating the sleeper screws, whenever a projection carried by the apparatus engages the sleeper. Such apparatus does not allow by any means solving the problem of associating the ties with the elastic attaching means referred to hereinabove and for which it is necessary that the accuracy of tightening of the sleeper screw may lie within one tenth of a millimeter.

My present invention has for its object an improved apparatus for the tightening of sleeper screws and the like parts, whereby said tightening may be obtained with the desired accuracy.

According to my invention, the apparatus includes a feeler adapted to engage the shoe of the rail and of which the tip may slide with reference to a member in contact with the attaching means for the rail. Means are provided for stopping the tightening operation of the sleeper screw whenever the levels of the feeler tip and of the contacting member are spaced by a predetermined distance. Said means stopping the tightening operation may include a switch inserted in the circuit feeding an electromagnetic clutch fed, for instance, by a dynamo generator or a magnetic flywheel driven by the power unit controlling the apparatus, said switch opening the circuit whenever the tip of the feeler has reached a predetermined position with reference to the member in contact with the rail attaching means.

According to a further feature of my invention, the switch is controlled by a rod elastically urged against a sleeve, the position of which is adjustable with reference to the feeler rod as a function of the distance to be obtained between the levels of the feeler tip and of the contacting member.

According to a still further feature of my invention, the contacting member is constituted by a spike-bar inside which the feeler may slide, said spike-bar being elastically connected with the apparatus through the agency of a tube and of a spring, for instance, so as to allow a continuous contact between the spike-bar and the attaching means, whatever may be the depression of the wrench over the head of the sleeper screw.

In the accompanying drawings, I have illustrated by way of a non-limiting example a preferred embodiment of my inventiton for clamping a sleeper screw in position. In said drawings:

FIG. 1 is an elevational view of such an apparatus.
FIG. 2 is a digrammatic plan view of a rail and of the attaching means thereof, said apparatus being shown as sectionalized along line II—II of FIG. 1.
FIG. 3 is a wiring diagram incorporated with the apparatus.
FIG. 4 is a longitudinal sectional view of the feeler.
FIG. 5 is a sectional view through line V—V of FIG. 4.
FIG. 6 is a side view of the lower end of the feeler.

In FIG. 1, the apparatus for tightening sleeper screws is shown as including a power unit 1 driving, through the agency of a speed reducer, an electromagnetic clutch 2, said system being carried by a chassis 3 provided with arms 4 and handles 5. The electromagnetic clutch 2 drives a shaft 6 through the agency of a Cardan joint 7. Said shaft drives in its turn, through the agency of another Cardan joint 8, a transmission gear 9 actuating a shaft 10, the lower end of which carries a wrench 11 which serves for the tightening of sleeper screws.

A carriage 12 is fitted on the chassis 3, so as to allow the apparatus as a whole to run over the rail 13. A feeler 14 is secured to the apparatus in a manner such that its tips may engage the shoe of the rail in proximity with the location of the attaching means 15 for the latter.

A control system 16 incorporating speed-reversing means is arranged in the transmission gear 9, so as to allow a release of any sleeper screw when it has been fortuitously tightened too much by the apparatus.

A shock absorber 17 is secured to the apparatus so as to prevent the feeler 14 from harshly engaging the head of the rail.

In FIG. 2, the rail is shown as including a flange 18 and a shoe 19. A small plate 20 forming the elastic attaching means securing the rail to the sleeper is held over the latter by the sleeper screw 21.

In the sectionalized parts of the apparatus, are shown the two feelers 14 and 14a located to either side of the wrench 11 engaging the sleeper screw 21. Two shock absorbers 17 and 17a are also shown to either side of the wrench 11.

The apparatus includes two feelers, so as to provide means for securing a sleeper screw to either side of the flange 18, the feeler 14 operating for the sleeper screw 21 illustrated in FIG. 2, while the feeler 14a operates only for another sleeper screw arranged symmetrically of the sleeper screw 21 with reference to the flange 18, the shock absorber 17a being of interest with a view to preventing any shock between the feeler 14a and the flange 18.

In FIG. 3 is illustrated diagrammatically a circuit 22 passing through switches 42 and 42a mounted on feelers 14 and 14a and feeding the electromagnetic clutch 2, as provided by a magnetic fly-wheel 23 controlled by the power unit 1.

When one of the feelers 14 and 14a is operative, it controls the switch 42 and 42a associated with it. When the predetermined distance which is to separate the tip of the feeler from the member in contact with the attaching means has been reached, the electric circuit 22 opens so that the electromagnetic clutch 2 is deenergized and no longer drives the transmission gear 9.

In FIGS. 4, 5 and 6 is illustrated a preferred embodiment of the feeler which includes a central rod 24, the lower end of which carries the feeler tip 25. Said rod carries a stop 26 adapted to limit the stroke of said rod.

Said stop is provided with a groove 27 inside which a screw 28 is engaged, so as to prevent any rotation of the rod 24 round its axis inside a tube 29 rigid with the casing 30, said rod being adapted to slide longitudinally of said tube 29.

A spike bar 31 inside which may slide the feeler rod 24 is provided at its lower end with a ridge 32 adapted to engage the attaching means of a rail, such as that illustrated in FIG. 2, at 20. Said spike bar forming the contacting member referred to hereinabove is connected with the chassis of the apparatus through a stationary carrier tube 33, a bias spring 34 being inserted between the spike bar 31 and said stationary tube 33. Said spring has for its object to allow the ridge 32 to engage the attaching means constituted by the plate 20 whatever may be the amount of travel of the wrench 11 over the head of the sleeper screw. The upper end of the rod 24 is threaded as shown at 35 and cooperates with an adjustable sleeve 36, the lower end of which engages a control member or bar 37 urged against the sleeve 36 by a spring 38 and terminating outwardly with a control knob 39.

As apparent from inspection of FIG. 5, the control arm 37 is provided with a radial projection adapted to engage an arm 41 on a switch 42 controlling the electric wires 43 forming part of the electric circuit 22 illustrated in FIG. 3. The control bar 37 may slide through the cover 44 of the casing 30.

A spring 45 acts on the lower end of the sleeve 36, so as to urge the latter downwardly and thereby to hold the stop 26 on the feeler rod 24 in contact with the spike bar 31.

The upper end of the sleeve 36 carries an adjusting knob 46 rigid with the same and said adjusting knob may be positioned by a screw-threaded connection 47 on the sleeve, while a set screw 48 holds said parts in their adjusted relative position.

A safety nut 49 is provided at the upper end of the feeler rod 24, so as to lock the adjusting knob 46 when the latter occupies the desired position. When the sleeper screw or the nut has been capped by the wrench 11, the ridge 32 of the spike bar 31 is in contact with the elastic attaching means of the rail such as the plate 20 shown in FIG. 2. The sleeper screw is then tightened through the agency of the wrench 11, the latter turning continuously. When the horizontal planes passing through the tip 25 of the feeler and through the ridge 32 are spaced by a predetermined value, the sleeve 36 has risen to a sufficient extent inside the casing 30, so as to release the control bar 37. The projection 40 on the latter is no longer in contact with the arm 41 on the switch and occupies the position 40a illustrated in dot-and-dash lines; the circuit is no longer closed and the electromagnetic clutch 2 is no longer energized. This stops consequently the tightening of the sleeper screw as soon as the distance between the levels of the rail shoe and of the upper section of the attaching means such as the plate 20 has reached the desired value within an allowance of 1/10 of a mm. at a maximum.

In FIGS. 4 and 5 are illustrated in dotted lines the positions assumed by the different elements, whenever the distance separating the tip 25 from the ridge 32 has reached the desired value corresponding to the termination of the tightening operation.

The operator using the apparatus described may adjust this distance to any desired value as required, for instance, by the thickness of the elastic attaching means, this being obtained by shifting the sleeve 36 longitudinally of the rod 24 of the feeler through a screwing or unscrewing of the knob 46. A scale carried by said knob allows executing said adjustment as required by the thickness of the attaching means used.

Once the adjustment has been executed, it is sufficient to screw down the safety nut 49 into contact with the adjusting knob 46, so that the sleeve 36 can no longer move longitudinally of the rod 24. The screw 28 engaging the groove 27 formed in the stop 26 connected with the rod 24 prevents said rod 24 from rotating during adjustment.

Obviously, my invention is by no means limited to the embodiments described and it covers, in contradistinction, all the modification falling within the scope of the accompanying claims.

What I claim is:

1. In an apparatus for tightening sleeper screws on means attaching a rail to a sleeper, the combination of a support, a feeler adjustably carried by said support and including a tip adapted to engage the rail shoe and a rod carrying said tip and carried in a vertically slidable condition by the support, a contact member adapted to engage the attaching means for the rail and carried by the support, a power unit, a wrench for the tightening of sleeper screws, a circuit controlling operation of the wrench, an electromagnetic clutch operatively connecting said power unit with the circuit, a switch in said circuit controlled by the feeler to open said circuit and to stop operation of the wrench whenever the feeler tip has reached a predetermined level with reference to the member in contact with the rail attaching means.

2. In an apparatus for tightening sleeper screws on means attaching a rail to a sleeper, the combination of a support, a feeler adjustable carried by said support and including a tip adapted to engage the rail shoe and a rod carrying said tip and carried in a vertically slidable condition by the support, a contact member adapted to engage the attaching means for the rail and carried by the support, a power unit, a wrench for the tightening of sleeper screws, a circuit controlling operation of the wrench, an electromagnetic clutch operatively connecting said power unit with the circuit, a switch in said circuit controlled by the feeler to open said circuit and to stop operation of the wrench, a member adjustably carried by the feeler rod in conformity with the desired value of the final distance between the levels of the feeler tip and of the contacting member, a control bar carried by the support and extending radially of the feeler rod, means urging said radial control bar towards said feeler-carried member to be held outwardly thereby and to be released as soon as the tip of the feeler has reached a predetermined level with reference to the contacting member and means whereby the control rod, when released, operates said switch.

3. In an apparatus for setting sleeper screws or track bolts to a predetermined degree of tightness, the combination of a support, a feeler adjustably carried by said support and having a contacting member, such as a spike-bar, containing a ridge, carried by an elastic suspension urging said ridge permanently against an elastic attaching means for a rail, a rod carried in a substantially vertical slidable condition inside said spike-bar, said rod carrying at its lower end a tip adapted to engage a shoe of said rail and at its upper end a controlling member adjustable thereupon, means allowing an extremely accurate positioning of said controlling member in conformity with the value of the distance to be obtained between the levels of the tip and of the ridge of the spike-bar, a power unit, a wrench for tightening said sleeper screws, and means controlled by said adjustable controlling member for cutting off operation of the apparatus as soon as the tip has reached the predetermined level with reference to the spike-bar.

4. In an apparatus for setting sleeper screws or track bolts to a predetermined degree of tightness, the combination of a support, a feeler adjustably carried by said support and having a contacting member, such as a spike-bar, containing a ridge, carried by an elastic suspension urging said ridge permanently against an elastic attaching means for a rail, a rod carried in a substantially vertical slidable condition inside said spike-bar, said rod carrying at its lower end a tip adapted to engage a shoe of said rail and at its upper end a controlling member adjustable thereupon, means allowing an extremely accurate positioning of said controlling member in conformity with the value of the distance to be obtained between the levels of the tip and of the ridge of the spike-bar, a power unit, a wrench for tightening said sleeper screws, a circuit controlling operation of said wrench, an electromagnetic clutch operatively connecting said power unit with the circuit, a switch in said circuit controlled by the adjustable controlling member of said rod to open said circuit and to stop operation of the wrench whenever the tip has reached the predetermined level with reference to the contacting member.

5. In an apparatus for setting sleeper screws or track bolts to a predetermined degree of tightness, the combination of a support, a feeler adjustably carried by said support and having a contacting member, such as a spike-bar containing a ridge, carried by an elastic suspension urging said ridge permanently against an elastic attaching means for a rail, a rod carried in a substantially vertical slidable condition inside said spike-bar, said rod carrying at its lower end a tip adapted to engage a shoe of said rail and at its upper end a controlling member adjustable thereupon, means allowing an extremely accurate positioning of said controlling member in conformity with the value of the distance to be obtained between the levels of the tip and of the ridge of the spike-bar, a power unit, a wrench for tightening said sleeper screws, a circuit controlling operation of the wrench, an electromagnetic clutch operatively connecting said power unit with the circuit, a switch in said circuit controlled by the adjustable controlling member of said rod to open said circuit and to stop operation of the wrench, a control bar carried by said support and extending radially of said rod, means urging said radial control bar towards the adjustable controlling member which has a configuration of a sleeve screwed on said rod so as to be held outwardly thereby and to be released as soon as said tip has reached the predetermined level with reference to the spike-bar ridge, and means whereby the control bar, when released, operates said switch.

References Cited in the file of this patent

UNITED STATES PATENTS

| | | |
|---|---|---|
| 772,113 | Osswald | Oct. 11, 1904 |
| 2,322,511 | Fischer et al. | June 22, 1943 |
| 2,384,399 | Reynolds | Sept. 4, 1945 |
| 2,409,397 | Sheehan et al. | Oct. 15, 1946 |
| 2,410,695 | Werner | Nov. 5, 1946 |
| 2,416,055 | Johndrew | Feb. 18, 1947 |
| 2,422,905 | Jackson | June 24, 1947 |
| 2,644,563 | Crary | July 7, 1953 |

UNITED STATES PATENT OFFICE
CERTIFICATE OF CORRECTION

Patent No. 3,017,794            January 23, 1962

Edmond Pouget

It is hereby certified that error appears in the above numbered patent requiring correction and that the said Letters Patent should read as corrected below.

In the heading to the printed specification, lines 5 and 6, for "Edmond Pouget, 190 Bis, Ave. de Stalingrad, Saint Ouen, France" read -- Edmond Pouget, Saint Ouen, France (190 Bis, Ave. de Stalingrad, Stains, Seine, France) --.

Signed and sealed this 31st day of July 1962.

(SEAL)
Attest:

ERNEST W. SWIDER
Attesting Officer

DAVID L. LADD
Commissioner of Patents